No. 700,316. Patented May 20, 1902.
F. F. FLAGG.
BALL COCK.
(Application filed Apr. 22, 1901.)
(No Model.)
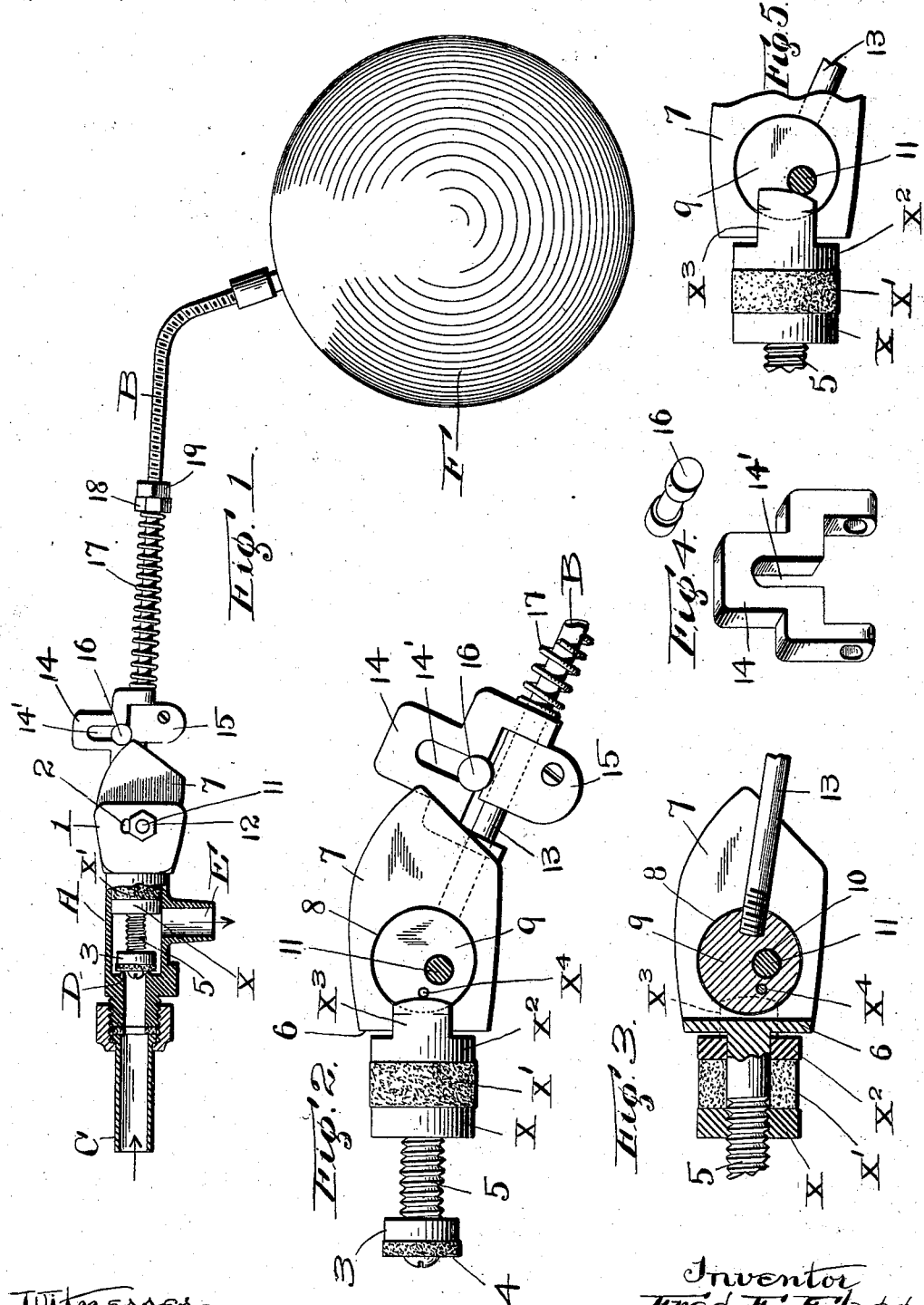
Witnesses
C. F. Wesson
Martin C. Lyden
Inventor
Fred F. Flagg
By
M. J. Lyden
Attorney.

UNITED STATES PATENT OFFICE.

FRED F. FLAGG, OF WORCESTER, MASSACHUSETTS.

BALL-COCK.

SPECIFICATION forming part of Letters Patent No. 700,316, dated May 20, 1902.

Application filed April 22, 1901. Serial No. 56,886. (No model.)

*To all whom it may concern:*

Be it known that I, FRED F. FLAGG, a citizen of the United States, and a resident of Worcester, in the county of Worcester and State of Massachusetts, have invented certain new and useful Improvements in Ball-Cocks, of which the following is a specification.

This invention relates to float-controlled valves for opening and closing an orifice through which water passes to supply a tank.

The mechanism to be described is an improvement upon my former invention of the same class patented April 23, 1901, and numbered 672,835. The improvements I have made upon the former construction are as follows: First, instead of employing a solid metallic bushing in the valve-casing to prevent discharge of water at the float end of the faucet I use an intermittingly expanding and contracting washer or gland; second, I provide automatic means whereby all "cutting" of the valve-seat is prevented. This latter is by far the important feature of my invention.

In an ordinary water-faucet of the screw-plug variety the operator by a turn on the handle can almost instantly shut off the fluid from a full stream. In the usual construction of floats or ball-cocks this quick action is impossible, since it is the comparatively slow ascent of the float that actuates the valve. Hence it is that in a ball-cock when the valve is open, perhaps not more than a hundredth of an inch, that the greatest wear or cutting of the valve-seat occurs. The water seeks to flow into the tank through the narrowing opening, and the velocity of the emitted stream is enormously increased. This condition, together with the presence of gritty particles in the water, wears bits out of the valve-seat, destroying the seat long before the other parts of the faucet show signs of wear. Inventors have tried air-chambers to provide for a quick valve-closure; but my construction is radically different and, unlike air-chambers, is perfectly reliable.

In the drawings, Figure 1 is a side view of the device when the valve is closed. Fig. 2 is a side view showing construction of the expansible gland and washers holding it in place. Figs. 3 and 4 are details. Fig. 5 is a modification.

A represents the casing, connected at its inlet end with the supply-pipe C, furnished with a valve-seat D. The discharge-pipe for conducting water to the tank is shown at E. The valve-casing at one end is bifurcated to form the bearing-plates 1, each of which is provided with a slot 2. These slots are at precisely right angles to the axis of the valve-casing. Working in the valve-casing is a valve 3, provided with a head 4, adapted to engage the seat D. The valve-stem 5 is screw-threaded and carries a metallic screw-threaded washer X. A rubber or other elastic washer X' is positioned between X and $X^2$, which latter is not threaded and is provided with arms $X^3$. Washer $X^2$ is loose upon the stem and serves to compress X' against the stationary washer X to expand X'. The valve-stem terminates in a shouldered head 6, bifurcated to provide the two end pieces 7 7. These end pieces are bored, as at 8. A cylindrical actuator 9 is positioned in the holes 8 loosely. At a suitable distance from its axial center the actuator is bored, as at 10. Passing through 10 loosely is a bolt 11, provided with a nut 12. A float is secured to the actuator by a rod B at 13, which point of connection is at the center of the actuator, and side strains are thus prevented. On either side of the actuator is cast a pin $X^4$. These pins when the float is at its lowest position, as shown in Fig. 2, bear against the arms $X^3$, throwing $X^2$ forward enough to squeeze X' against X. Upon the rod B is loosely fitted an abutment 14, slotted, as at 14'. An adjustable stop 15 is tightly secured upon the rod and serves to guide the rider 16 up the slot 14'. This stop also compensates for wear of the parts by being loosened and then moved forward and tightened at the desired position. A spring 17 surrounds the rod B loosely, bearing at one end against the movable abutment 14, at the other against the nuts 18 19, which are employed not only to hold the spring, but to tighten or loosen it, as the pressure is low or high. The function of the spring is to keep the float depressed on its upward movement, and in this manner to resist the buoyant tendency of the water flowing into the tank. In this invention it will be noted that bearing-plates 7 are furnished with inclines at their rear ends.

The operation may now be described. When the float is at the position shown in Fig. 2, water from the main is flowing into the tank. The float rises, and the rider 16—a cylindrical piece of metal—engages the inclines of 7. This forces the movable abutment 14 against the spring, compressing the spring. This compression of the spring, acting upon nuts 18 19, forces the float downward in the water against the constantly-acting buoyant force of the fluid. When the rider has reached the top of the inclines, a practically full flow of water is entering the tank, and up to this point there can be no cutting of the seat. The instant the rider passes the edge of the inclines the spring is released from compression, the rider is thrown out of the way up the slot 14', and the float from its depressed position in the water is instantly acted upon by the buoyant forces of the water, which were till then greatly counteracted by the compressed spring. The valve is shot into place, and the full flow of water ceases at once. As in my patent, the valve is closed by the rod B turning the actuator about its axis 11 and shoving the shouldered head 6 of the valve forward with a rolling motion.

It will be seen there can be no cutting of the seat, because there is no chance for the sizzling of a thin stream of great velocity through a slowly-narrowing aperture. The operation of closing this valve is practically instantaneous and is of necessity reliable from day to day, since it is the buoyant force of the water that acts upon the float and the valve. The nuts 18 19 provide an adjustment for different pressures of water. The stop provides the adjustment for wear of inclines or slot. When the float is at its lowest position, the pins $X^4$ on the actuator are, as shown in Fig. 2, at their farthest position of forward movement and bear strongly upon the arms $X^3$ of the movable washer $X^2$. The rubber gland $X'$ is compressed between X and $X^2$ and expanded radially, completely filling the bore of the casing and rendering it impossible for the running water to force its way through the rear of the casing. These pins keep the gland sufficiently expanded until the rider has passed the edges of the inclines. Then the force against $X^2$ is relaxed and the rubber gland contracts. This construction obviates all necessity for a tightly-fitting bushing, as in my former construction, and is much cheaper than such a bushing. All wear of any importance comes upon the gland, which is easily replaced. It will be observed that the expansion of the gland occurs only when the stream from the main is entering and that the gland continues in its normal or unexpanded condition when the valve is closed and the stream is shut off.

In the modification shown in Fig. 5 the arms $X^3$ are lengthened and the bolt 11 urges them forward as the float descends.

What I claim, and desire to secure by Letters Patent, is—

1. In a flushing-tank, the combination of a valve, a float in connection with the valve, a spring, at one end in operative connection with the float and at the other end in engagement with an adjustable abutment, means coacting with the abutment whereby the spring is progressively compressed during the rise of water in the tank substantially as set forth.

2. In a flushing-tank, the combination of a valve, a float in connection with the valve, resilient means to submerge the float for a predetermined interval in opposition to the buoyant force of the rising water, an adjustable abutment coacting with said resilient means, a rider operatively connected with the abutment and the valve to contract the said resilient means as and for the purpose set forth.

3. In a flushing-tank, the combination of a valve, a rod and float in connection therewith, a spring operatively surrounding said rod, an adjustable and movable abutment in contact with one end of the spring, means whereby the abutment is actuated to contract said spring as and for the purpose set forth.

4. In a flushing-tank, the combination of a valve, a rod and float in connection therewith, a spring surrounding said rod and in operative connection therewith, to submerge said float against the buoyant force of the inflowing water, an adjustable and movable mechanism loosely held upon the rod and cooperating with the valve and spring to contract said spring and thus submerge the float substantially as set forth.

5. In a flushing-tank, the combination with a valve-stem of an elastic gland, a loose washer, provided with arms, bearing against said gland, operating means for said valve-stem, one or more lugs secured to said valve-stem-operating means, and bearing against said washer-arms to expand said gland substantially as described.

In testimony whereof I have affixed my signature in presence of two witnesses.

FRED F. FLAGG.

Witnesses:
JOHN W. WOOD,
MICHAEL J. LYDEN.